United States Patent [19]

Luckanuck

[11] Patent Number: 4,960,621

[45] Date of Patent: Oct. 2, 1990

[54] METHOD OF INSULATING WITH INORGANIC NON-COMBUSTIBLE FOAM

[75] Inventor: John S. Luckanuck, Burlington, Canada

[73] Assignee: Radixx/World, Ltd., Burlington, Canada

[21] Appl. No.: 400,451

[22] Filed: Aug. 30, 1989

[51] Int. Cl.$^5$ ................................................ B05D 3/02
[52] U.S. Cl. .................................. 427/397.8; 106/602; 106/605; 252/605; 252/607; 428/921
[58] Field of Search .................... 106/74, 84; 252/605, 252/607; 427/397.8; 428/921

[56] References Cited

U.S. PATENT DOCUMENTS

| | | | |
|---|---|---|---|
| 3,466,221 | 9/1969 | Sams et al. | 252/62 X |
| 4,218,502 | 8/1980 | Graham et al. | 428/921 X |
| 4,347,285 | 8/1982 | Batdorf | 427/388.4 |

*Primary Examiner*—Michael Lusignan
*Attorney, Agent, or Firm*—Tilton, Fallon, Lungmus & Chestnut

[57] ABSTRACT

A method of applying an inorganic non-combustible foam making use of separately packaged sodium silicate as a liquid and a mixture of sodium silico fluoride, silicon metal and a filler.

3 Claims, No Drawings

METHOD OF INSULATING WITH INORGANIC NON-COMBUSTIBLE FOAM

BACKGROUND AND SUMMARY OF INVENTION:

This invention relates to a method of insulating with an inorganic, non-combustible foam and, more particularly, to a foam which constitutes an improvement on Canadian Patent No. 830,526 and corresponding U.S. Pat. No. 3,466,221.

In the above-mentioned patents, an expanded silicate insulation was developed utilizing 80 to 90% of sodium silicate, 3 to 6% asbestos fiber, 0.2 to 0.6% silicon metal and 6 to 15% sodium silico fluoride to provide a mass three times its original thickness.

I have found that by substantially increasing the silicon metal using a specific filler other than asbestos fiber and in a higher amount, and a much lower sodium silicate, I can obtain substantially higher foam volume.

In particular, I employ about 64% of sodium silicate in one package constituting a liquid ingredient and in another package about 8% silicon metal, about 20% of a a filler selected from the class consisting of wollastinite, perlite and mixtures thereof and about 8% sodium silico fluoride. These, when mixed, generate foam at least of the order of 6 times the volume of the packaged contents.

As such, the resultant product is exceptionally suitable for use in cavities, wiring and for insulation purposes, etc. This eliminates the messy water and cement spray that are presently used. The fire retardant spray-on insulation for industrial, commercial and residential construction may be used for wood or steel column temperature rise criteria, or as a spray-on insulation for steel walls, roof or concrete construction.

The product under room temperature will foam in approximately 2 hours and if some heat is applied will foam in approximately 10 minutes.

DETAILED DESCRIPTION:

The invention is best illustrated by the following example.

EXAMPLE

The formula for non-combustible foam is as follows:

| | |
|---|---|
| Sodium Silicate | 64% |
| Sodium Silico Fluoride | 8% |
| Silicon Metal | 8% |
| Wollastinite | 20% |
| | 100% |

The sodium silicate is a fairly dense product marketed by the PQ Corporation of Valley Forge, Pa. under the designation "K" and having a weight ratio of $SiO_2/Na_2O$ of about 2.9.

The sodium silico fluoride which is also known as sodium hexa-fluorosilicate is available as $Na_2SiF_6$ from Minerals and Chemicals Limited of Oakville, Ontario under designation SSF.

Silicon metal is available from the Elkom Metals Company of Niagara Falls and is virtually pure silicate. This is the foaming agent.

Wollastinite is calcium metasalitcate having the formula $CaSiO_3$ and is available under the trade designation Nyad G from Prescott Chemical of Toronto, Canada.

The above formula is a two-part mixture with the dry chemicals premixed together and packaged with the liquid silicates being separately packaged. The mixed product may be poured into cavities or pumped into the area for foaming between floor and ceiling joists or used in cavities where electrical wiring is in place.

Wallastinite is a strength filler and if a lighter density of inorganic foam is required, lightweight perlite (volcanic glass) can be substituted for the Wallastinite in whole or in part.

The product foams 6 to 10 times its original size after mixing. At normal room temperatures the foaming takes place in one to two hours whereas if the liquid is heated into the range of 100° F. to 150° F., the time for foaming may be as little as 5 to 15 minutes.

While in the foregoing specification a detailed description of an embodiment of the invention has been set down for the purpose of illustration, many variations in the details hereingiven may be made by those skilled in the art without departing from the spirit and scope of the invention.

I claim:

1. A method of applying an inorganic non-combustible foam comprising the steps of providing about 64% of sodium silicate having an $SiO_2.Na_2O$ ratio of about 2.9 in one package, providing in another package about 8% sodium silico fluoride, about 8% silicon metal and about 20% of a filler, said filler being a member selected from the class consisting of Wollastonite, perlite and mixtures thereof, mixing the contents of the two packages and applying the mixed contents to an area to be rendered fire retardant, said mixed contents having a volume at least 6 times that of the added volumes of the packaged contents.

2. The method of claim 1 in which said applying step is performed at room temperature and approximately 1 to 2 hours after mixing.

3. The method of claim 1 in which said applying step is performed at a temperature above about 100° F. and approximately 5 to 30 minutes after mixing.

* * * * *